(12) United States Patent
Wartmann et al.

(10) Patent No.: US 6,310,731 B1
(45) Date of Patent: Oct. 30, 2001

(54) ANASTIGMATIC ANAMORPHIC LENS

(75) Inventors: Rolf Wartmann, Hallgarten; Udo Schauss, Waldböckelheim, both of (DE)

(73) Assignee: Jos. Schneider Optische Werke GmbH, Kreuznach (DE)

(*) Notice: Subject to any disclaimer, the term of this patent is extended or adjusted under 35 U.S.C. 154(b) by 0 days.

(21) Appl. No.: 09/522,672

(22) Filed: Mar. 10, 2000

(30) Foreign Application Priority Data

Mar. 17, 1999 (DE) .................................. 199 11 862

(51) Int. Cl.[7] .............................. G02B 13/08; G02B 3/00
(52) U.S. Cl. .......................... 359/668; 359/671; 359/649
(58) Field of Search .................................. 359/649–651, 359/668–671

(56) References Cited

U.S. PATENT DOCUMENTS

| | | |
|---|---|---|
| 1,962,892 | 6/1934 | Chretien . |
| 2,731,883 | 1/1956 | Kohler et al. . |
| 2,821,110 | 1/1958 | Cook . |
| 2,933,017 | 4/1960 | Kingslake et al. . |
| 2,956,475 | 10/1960 | Harris et al. . |
| 3,517,984 | 6/1970 | Lindstedt et al. . |
| 3,682,533 | 8/1972 | Vetter . |
| 3,924,933 | 12/1975 | Hirose . |
| 4,362,366 | 12/1982 | Gottschalk . |

FOREIGN PATENT DOCUMENTS

| | | |
|---|---|---|
| 350 813 | 1/1961 | (CH) . |
| 971 992 | 4/1959 | (DE) . |
| 2 315 814 | 10/1973 | (DE) . |
| 8427849.8 | 1/1985 | (DE) . |
| 34 36 913 | 4/1986 | (DE) . |
| 36 29 438 | 4/1988 | (DE) . |
| 41 04 684 | 6/1992 | (DE) . |
| 0 388 704 | 9/1990 | (EP) . |
| 1 082 780 | 6/1954 | (FR) . |

*Primary Examiner*—Georgia Epps
*Assistant Examiner*—Michael A. Lucas
(74) *Attorney, Agent, or Firm*—Herbert Dubno

(57) ABSTRACT

An anastigmatic anamorphic lens, in particular for the projection of Cinemascope films, with a high aperture and an anamorphic factor of greater than 1.7. The anastigmatic anamorphic lens comprises a main objective with considerable positive astigmatism. A main objective which might otherwise be unsuitable for projection because of aberration phenomena, in combination with cylindrical afocal attachments, has its image defects supplemented with the typical aberrations of the attachments in such a way as to achieve an optimum overall result.

4 Claims, 4 Drawing Sheets

ANASTIGMATIC ANAMORPHIC LENS

SPECIFICATIONS

Field of the Invention

The present invention concerns an anastigmatic anamorphic lens, in particular for the projection of cinemascope films.

BACKGROUND OF THE INVENTION

The height-to-side ratio of the images in the case of Cinemascope films is generally 1:2.35. That projection format corresponds to the psychological visual perception of a human being better than other narrower formats. Problems are incurred however when recording the originals on the conventional 35 mm-wide film format as the resulting images become too narrow and too small to be able to achieve good results upon projection. For that reason the images are squeezed horizontally by a factor of 2 upon recording. That affords images of normal size on conventional film material, but that squeeze effect has to be reversed upon projection. That is implemented by means of anamorphic objectives. Optical systems of that kind, also referred to as anamorphic lenses, primarily differ from conventional objectives by virtue of the fact that the focal length in a horizontal direction differs markedly from that in the vertical direction. The ratio of those two focal lengths is also referred to as the anamorphic factor. If the horizontal focal length is precisely half that of the vertical focal length, the desired effect of image expansion occurs in the horizontal. If such an anamorphic lens is used to project for example a Cinemascope film, it completely eliminates the squeeze or compression effect introduced upon recording and produces an undistorted image on the screen.

It is known for anamorphic objectives to be constructed in two different ways. Both approaches are based on a corrected main objective which is supplemented by an objective which is entirely made up of unitarily oriented cylindrical lenses.

An anamorphic objective in accordance with the one proposal is described for example in U.S. Pat. No. 2,933,017. Therein, the additional objective which has zero refractive power because of the unitary orientation of the cylindrical lenses in one direction is positioned between the main objective and the film plane. Such an objective is compact and suitable for projection with low aperture values. In the case of high apertures or with large projection angles however that design principle fails, as already explained in U.S. Pat. No. 3,924,933.

The other proposal involves positioning the cylindrical additional objective in front of the main objective. Structures involving that principle are described in U.S. Pat. Nos. 1,962,892 and 2,821,110. Anamorphic objectives of that type are suitable both for wide-angle uses and also for high-aperture uses. Such objectives however are very bulky and heavy. The recommendation therefore for example in U.S. Pat. No. 2,731,883 is to use anamorphic objectives of that kind only in the case of anamorphic factors of less than 1.5 as excessive residual aberration phenomena occur with greater anamorphic factors.

Irrespective of those disadvantages, most projection anamorphic lenses for Cinemascope projection with an anamorphic factor of 2.0 are based on that principle. The excessive residual aberration phenomena are tolerated but they do result in a considerable worsening of image quality.

Spherical attachments for the cylindrical attachments as are described for example in U.S. Pat. No. 2,956,475, German patent specification No 971 992, French No 1 082 780 and U.S. Pat. No. 3,682,533, can make no contribution to improving the imaging power of projection anamorphic lenses. Those spherical attachments permit a focusing action without thereby simultaneously causing a change in the anamorphic factor.

Swiss patent specification No. 350 813, U.S. Pat. No. 3,517,984, German G 84 27 849.8, German patent specification No. 34 36 913 and German patent specification 36 29 438 put the focusability of anamorphic objectives at the center.

Thus however different the two design principles for anamorphic objectives may be, nonetheless they both have similar quality problems in terms of image quality.

Anamorphic systems which are constructed on the basis of corrected main objectives again and again result in anamorphic lenses which at the center of the image have a corrected spherical aberration and no astigmatism, and in the direction in perpendicular relationship to the cylinder axes they are free of coma, image field curvature and astigmatism. However severe curvature of the sagittal image shell always occurs in the direction of the cylinder axes, whereas the meridional is flattened. That astigmatism makes itself disturbingly noticeable upon Cinemascope projection, in a vertical direction. Here the image becomes blurred and fuzzy. The fact that the drop in resolution occurs in particular upon imaging of the radial structures is quite particularly unpleasant as the image is expanded in that direction. Here a particularly good level of imaging quality should actually exist in order to achieve a uniformly good projection result. It can be demonstrated by theory that this image defect which is typical of anamorphic lenses with cylindrical lenses is inevitable if the usual known design principles are applied. The introduction of additional spherical or crossed cylindrical lenses, as described for example in EP 0 388 704 and DE 41 04 684 only immaterially reduce such aberration phenomena. A lasting improvement can be achieved only by a reduction in the anamorphic factor or by a marked increase in structural length. Both are out of the question in terms of Cinemascope projection. On the one hand the anamorphic factor of 2.0 is fixedly preset while on the other hand the increase in structural length at the same time signifies a cut in the projection angle as the objective diameter cannot be increased just as desired.

In the case of anamorphic systems the occurrence of the excessive residual image defects can be avoided only if novel basic principles for design are used.

Such an attempt was undertaken in accordance with U.S. Pat. No. 4,362,366. Here, the two design principles described in the opening part of this specification were used at the same time in one objective. That made it possible to reduce the anamorphic factor for each of the two cylindrical sub-systems. The anamorphic factor of the overall system is here the product of the sub-systems. Astigmatism in a vertical direction could be controlled by virtue of the crossed installation of the cylindrical systems. At the same time however the arrangement involved higher-order aberration phenomena, in particular clover leaf defects, with the result that that approach cannot be used for aperture ratios of over 1:5.6.

OBJECT OF THE INVENTION

Therefore the object of the present invention is to develop a high aperture anamorphic system for Cinemascope projection, which yields a more uniform and markedly better image quality than the solutions which are conventional at the present time, which in that respect attains an aperture number of 1:2 and whose anamorphic factor is about 2.0.

SUMMARY OF THE INVENTION

In accordance with the invention that object is attained in that the basic starting point adopted is not, as usual, a corrected main objective which can be used independently. On the contrary the basic starting point involved are conventional cylindrical attachments which are usual at the present time and which in section perpendicularly to the oriented cylinder axes form afocal systems with a telescope magnification of about 0.5. In accordance with the invention those attachments are supplemented by main objectives which have special non-corrected aberration phenomena. The improved image quality of the overall system comes about because those aberration phenomena of the main objective and the above-described typical astigmatism of the cylindrical-lens systems advantageously involve mutual supplementation.

BRIEF DESCRIPTION OF THE DRAWING

In accordance with the invention the design of the main objective involves three possible configurations whose features and advantages will be apparent from the following description with reference to the accompanying drawing in which.

SPECIFIC DESCRIPTION

The first embodiment of the invention involves the use of a main objective with flattened image field and a negative Petzval sum. In that respect, both the flattened image field and also the Petzval sum are to be related to the film surface which in the case of Cinemascope projection is curved a little in the projection direction. The Petzval sum P should be between −0.0015 and −0.0035. In order with that magnitude of the Petzval sum nonetheless to have a flattened image field, there must be a slight astigmatism A which is of the following magnitude:

$$A = -\tfrac{1}{2}P,$$

For the meridional and sagittal image shells that affords the following curvatures M and S:

$$M = -3 \times A - P = \tfrac{1}{2}P,$$

$$S = -A - P = -\tfrac{1}{2}P.$$

Figure 2:
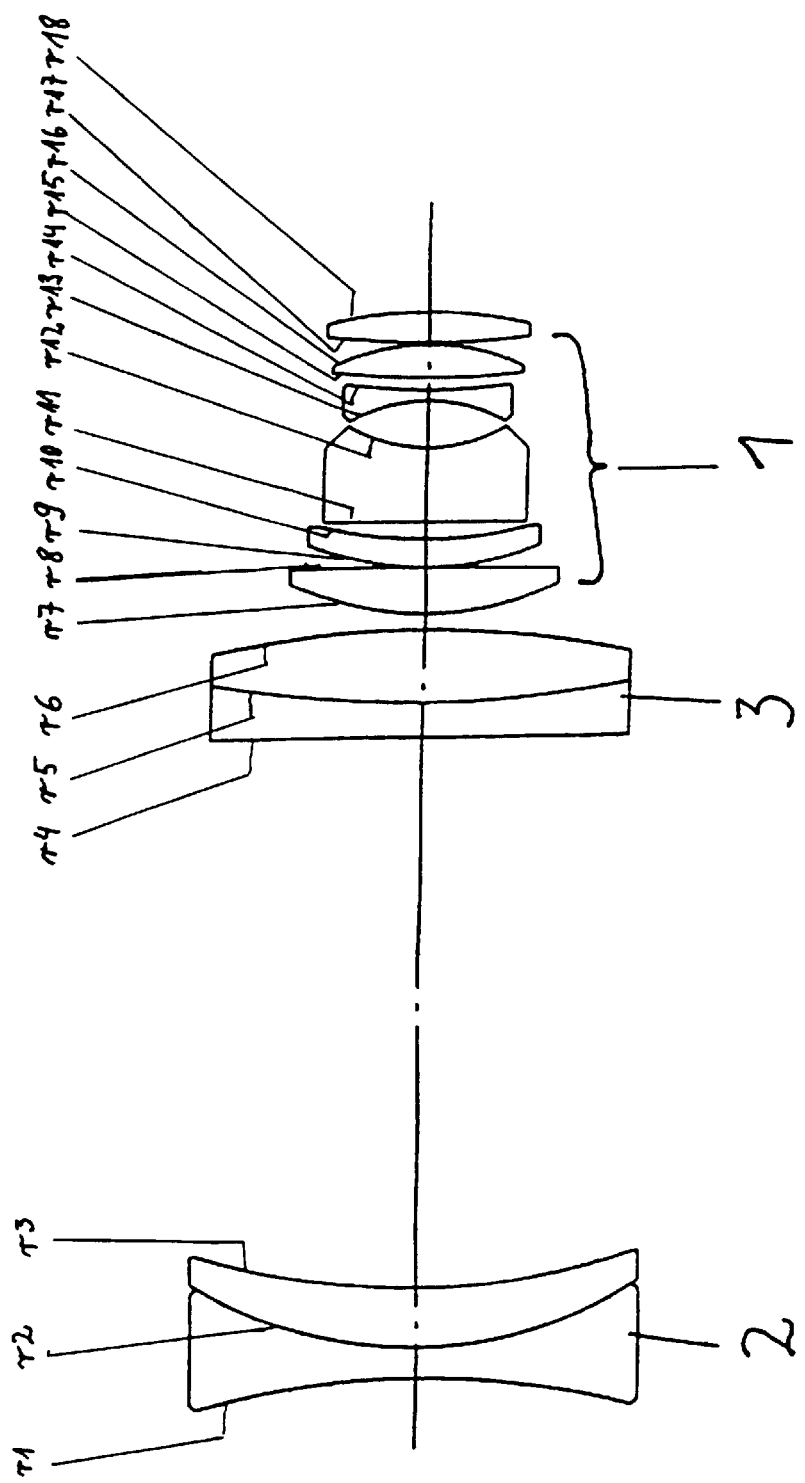
FIG. 2 is a view in section of a first embodiment of the anastigmatic anamorphic lens according to the invention.

Accordingly a main objective 1 according to the invention has a meridional shell which is negatively curved with respect to the film surface. The sagittal shell is positively curved by the same amount. Although the optimum image shell which is precisely between the meridional and the sagittal shells coincides with the film, a main objective 1 according to the invention is poorly suited as a projection objective, because of the perceptible astigmatism. It is only in combination with an attachment of cylindrical lenses 2 and 3 with an anamorphic factor of about 2.0 that a high-resolution projection objective is obtained, as described with reference to FIG. 2.

In order to describe this in greater detail, the typical image defects of cylindrical attachments should be discussed somewhat more closely than above. Such attachments are identical in section perpendicularly to the cylinder axes to a Galilean telescope, that is to say a sub-system 2 with a negative focal length $f_2$ is separated by a relatively large air space from a second sub-system 3 with a positive focal length $f_3$. The rear focal point of the sub-system 2 and the front one of the sub-system 3 coincide whereby the attachment becomes afocal. The ratio of $f_3$ to $-f_2$ determines the anamorphic factor.

Consequently upon Cinemascope projection $f_3$ is approximately twice as great as $-f_2$. Consequently the negative refractive powers predominate, which results in a slightly positive curvature $M_1$ of the meridional image surface in the horizontal image field. $M_1$ is mostly between +0.0005 and +0.0025. Because of the lack of refractive power in the direction of the cylinder axes, the sagittal section remains uninfluenced and the sagittal image surface thus remains flat. In combination with the main objective according to the invention the overall curvatures $M_H$ and $S_H$ for the meridional and the sagittal image shells are as follows:

$$M_H = M + M_1 = \tfrac{1}{2}P + M_1,$$

$$S_H = S = -\tfrac{1}{2}P.$$

As $M_1$ is of the same order of magnitude as $-\tfrac{1}{2}P$ it is possible to reckon with a flattened meridional image shell. Astigmatism is significantly reduced thereby. The sagittal image shell in contrast is curved in the positive direction. That curvature is admittedly a problem but it can be accepted as no spreading or expansion of the image field occurs horizontally in the sagittal direction, and in addition the curvature even with $-\tfrac{1}{2}P$ is not excessively great.

Those considerations apply in respect of the horizontal image field. The situation is fundamentally different in the vertical image field. Here the meridional section does not experience any change, due to the attachment. For the sagittal section in contrast there is the above-described pronounced negative shell curvature $S_1$. It is between −0.0025 and −0.0045. In combination with the main objective according to the invention vertically the overall curvatures $M_V$ and $S_V$ for the meridional and the sagittal image shells are as follows:

$$M_V = M = \tfrac{1}{2}P,$$

$$S_V = S + S_1 = -\tfrac{1}{2}P + S_1.$$

As $S_1$ and P are approximately equal, $S_V$ is approximately halved in comparison with $S_1$. In addition astigmatism entirely disappears. Both aspects denote a significant improvement in the imaging quality in comparison with the state of the art.

Table I sets out the design data of a first embodiment according to the invention:

TABLE I

| No | Radii | Spacings | Refractive indices $n_e$ | Abbe numbers $v_e$ |
|---|---|---|---|---|
| 1 | −101.3* | 4.0 | 1.591 | 61.0 |
| 2 | 50.0* | 7.7 | 1.762 | 27.2 |
| 3 | 87.3* | 71.3 | air | |

TABLE I-continued

| No | Radii | Spacings | Refractive indices $n_e$ | Abbe numbers $v_e$ |
|---|---|---|---|---|
| 4 | ∞ | 4.4 | 1.711 | 30.3 |
| 5 | 122.4* | 9.5 | 1.716 | 53.8 |
| 6 | −122.4* | 2.0 | air | |
| 7 | 38.4 | 6.0 | 1.681 | 54.9 |
| 8 | −783.3 | 0.1 | air | |
| 9 | 35.9 | 3.8 | 1.758 | 52.3 |
| 10 | 55.5 | 2.2 | air | |
| 11 | −575.3 | 9.2 | 1.624 | 36.4 |
| 12 | 18.8 | 6.1 | air | |
| 13 | −18.5 | 1.5 | 1.704 | 30.1 |
| 14 | 70.7 | 1.7 | air | |
| 15 | 99.6 | 4.4 | 1.792 | 47.5 |
| 16 | −26.0 | 0.3 | air | |
| 17 | 115.2 | 3.9 | 1.732 | 54.7 |
| 18 | −53.2 | | | |

*cylindrical surfaces
aperture ratio 1:2
focal lengths: 60.6 and 31.5
anamorphic factor: 1.923
intercept length: 43.3

Figure 1:
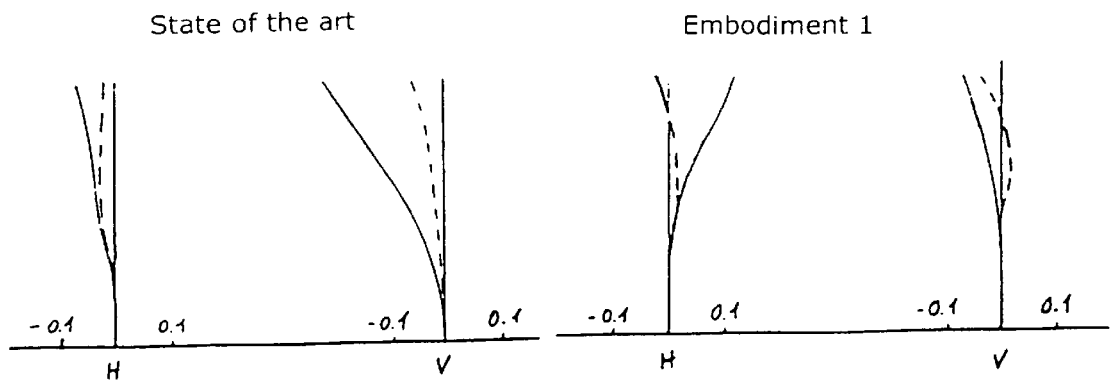
FIG. 1 is a graphic representation of the curvatures of the sagittal and meridional image shells.
Figure 1:
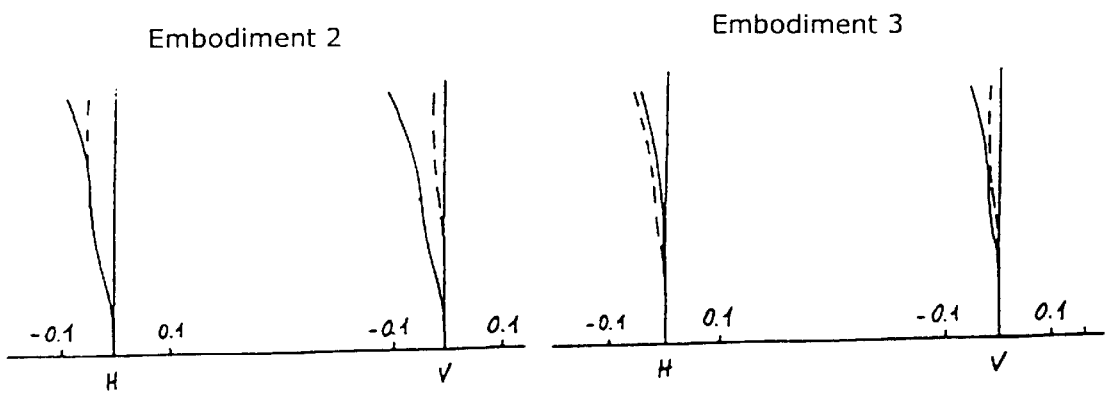

FIG. 1 shows the horizontal and vertical deviations of the position image shells (image field curvature) with respect to the film for the embodiments described hereinafter of the solution according to the invention. In comparison thereto the values are shown for a construction corresponding to the state of the art, comprising the cylindrical attachment of embodiment 1 combined with a corrected main objective of a focal length of 61 mm. As a result of improved image flattening for example embodiment 1 has a markedly better degree of resolution in the vertical direction of the image field. Horizontally the resolution capability is only radially somewhat weaker, which however can be tolerated as no expansion of the image structure occurs in that azimuth.

Figure 3:
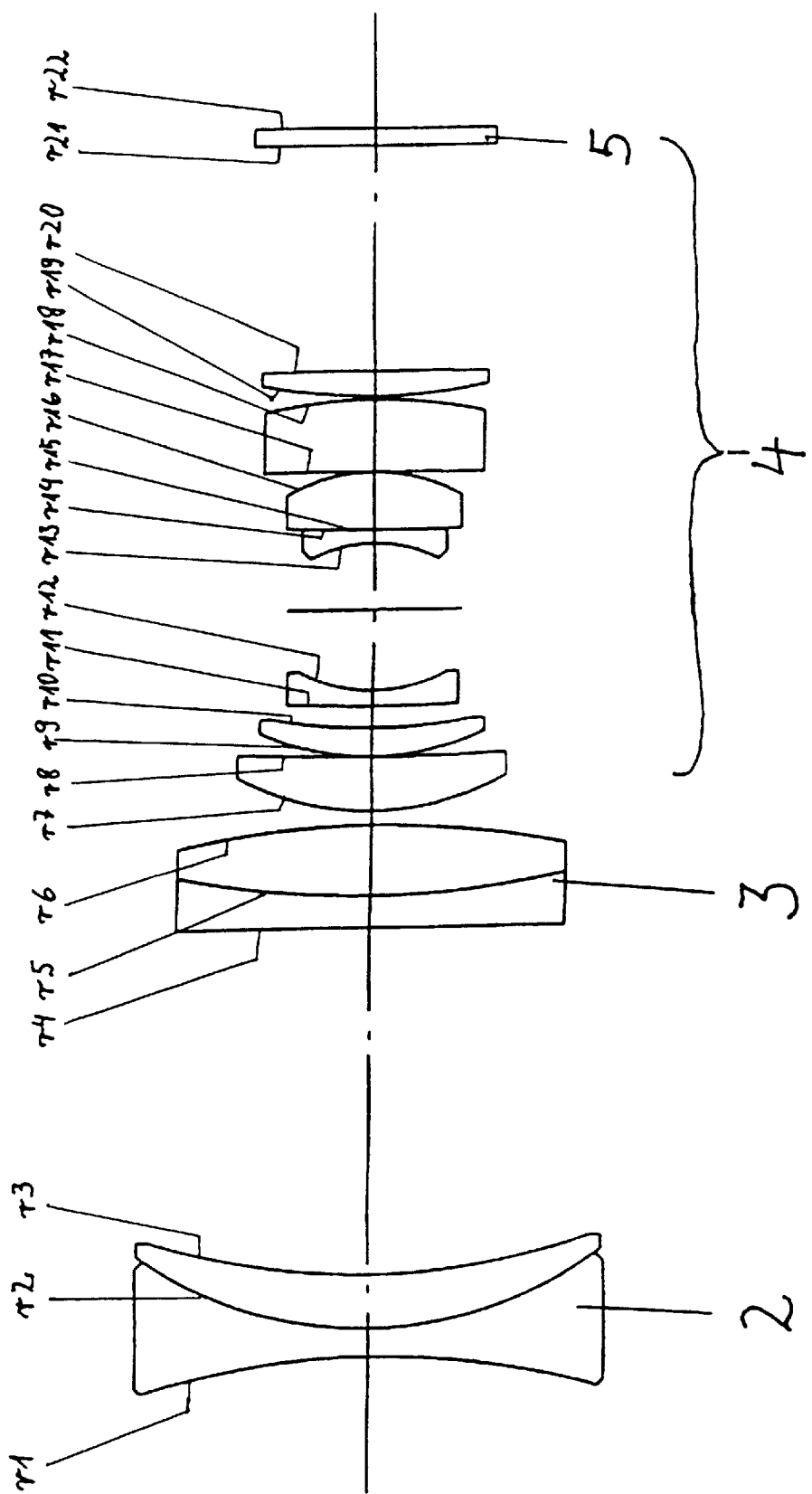
FIG. 3 is a view in section of a second embodiment of the anastigmatic anamorphic lens according to the invention.

A second embodiment (FIG. 3) relating to the construction of a main objective 4 according to the invention is based on such a one with a flattened Petzval curvature and slight positive astigmatism A. A is between 0.0001 and 0.0006. On the film side this main objective 4 has a cylindrical lens 5 of low refractive power. In this case the cylindrical lens 5 is positioned in the immediate proximity of the film and is oriented in such a way that the cylinder axis extends horizontally. Its refractive power should be between −0.003 and −0.015. A main objective 4 designed in such a fashion has horizontally a flattened image field. Vertically in contrast the image field is curved positively by the amount B of between 0.001 and 0.008. Because of that relatively great degree of curvature in the vertical the main objective 4 is poor for use as a projection objective although it is almost free of astigmatism. If it is combined with a cylindrical attachment comprising lenses, 2 and 3, similarly to the first alternative configuration, an excellent overall result is obtained. For that purpose the cylindrical attachment is oriented in such a way that its cylinder axes face in the vertical direction. Similarly to the foregoing description, that affords the following shell curvatures:

$M_H = M_1 - 3A$, $S_H = -A$, $M_V = B - 3A$, $S_V = B + S_1 - A$.

With the meridional parameters $M_H$ and $M_V$, $M_1$ and B are significantly reduced by the slight astigmatism A which is involved in the formula intensified three times. $S_H$ is small by nature as A is small. In the case of $S_V$, B and $S_1$ very substantially cancel each other out. That thus affords a projection objective with a substantially flattened image field and slight astigmatism. The resolution capability has been substantially improved in comparison with the state of the art.

Table II sets out the design data of this second embodiment according to the invention:

TABLE II

| No | Radii | Spacings | Refractive indices $n_e$ | Abbe numbers $v_e$ |
|---|---|---|---|---|
| 1 | −101.3* | 4.0 | 1.591 | 61.0 |
| 2 | 50.0* | 7.7 | 1.761 | 27.2 |
| 3 | 87.3* | 70.9 | air | |
| 4 | ∞ | 4.4 | 1.711 | 30.3 |
| 5 | 122.4* | 9.5 | 1.716 | 53.8 |
| 6 | −122.4* | 2.0 | air | |
| 7 | 35.8 | 7.6 | 1.681 | 54.9 |
| 8 | 299.6 | 0.1 | air | |
| 9 | 34.7 | 3.9 | 1.737 | 50.8 |
| 10 | 71.7 | 3.0 | air | |
| 11 | 236.9 | 2.2 | 1.617 | 36.7 |
| 12 | 18.7 | 20.5 | air | |
| 13 | −17.5 | 1.8 | 1.747 | 27.6 |
| 14 | 410.9 | 0.1 | air | |
| 15 | 420.0 | 7.9 | 1.808 | 46.3 |
| 16 | −23.8 | 0.1 | air | |
| 17 | 492.4 | 9.7 | 1.591 | 61.0 |
| 18 | −63.9 | 0.5 | air | |
| 19 | 73.0 | 3.5 | 1.748 | 44.4 |
| 20 | −854.9 | 31.5 | air | |
| 21 | ∞ | 2.5 | 1.519 | 64.0 |
| 22 | 104.0# | | | |

*cylindrical surfaces
cylindrical surface in relation to * turned through 90° about the optical axis
aperture ratio 1:2
focal lengths: 59.0 and 30.3
anamorphic factor: 1.947
intercept length: 2.8

Figure 4:
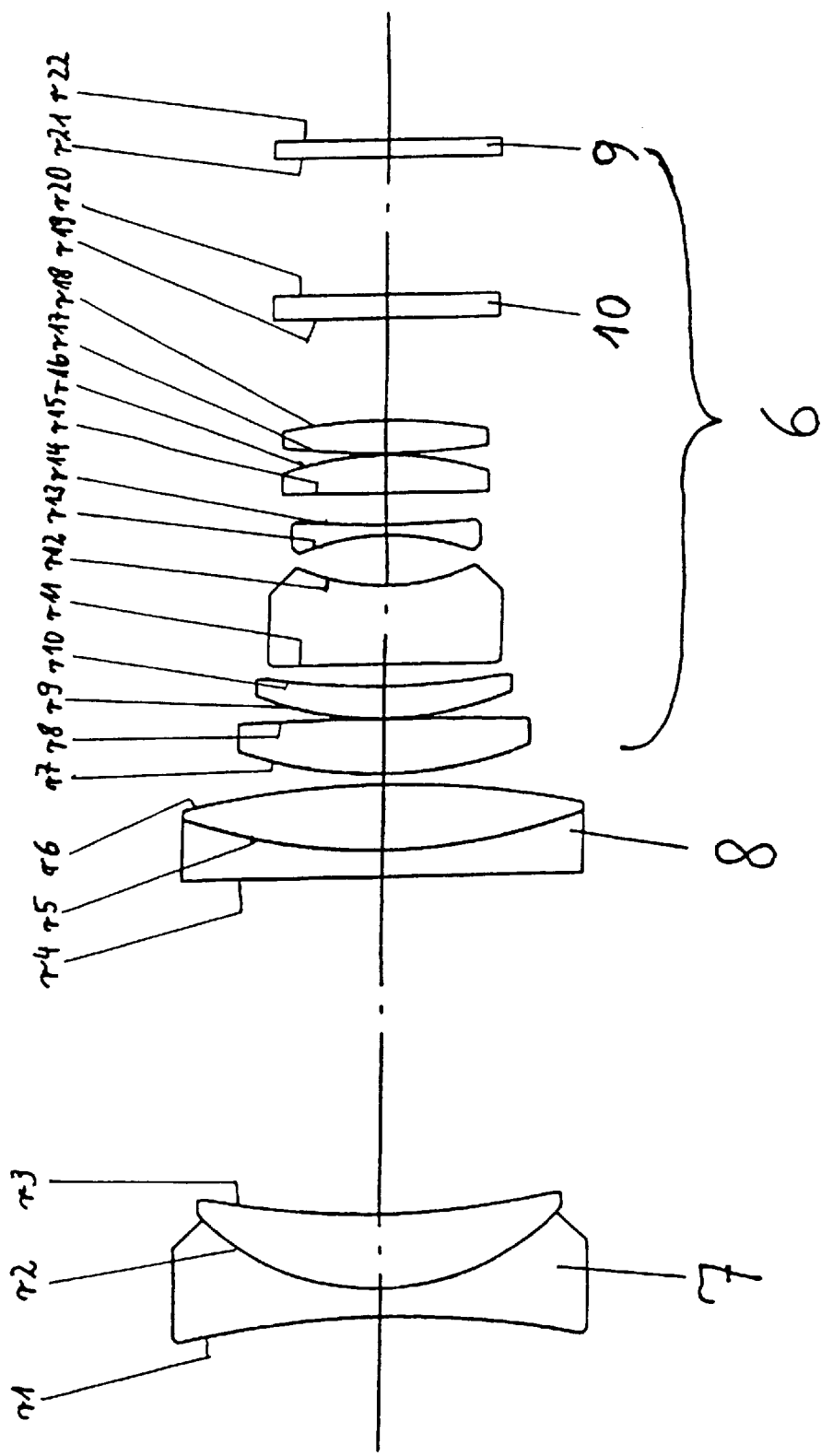
FIG. 4 is a view in section of a third embodiment of the anastigmatic anamorphic lens according to the invention.

As shown in FIG. 4, and similarly to the alternative embodiment 2, a third alternative configuration of the projection objective according to the invention comprises a main objective 6 according to the invention and a two-part cylindrical attachment 7 and 8. The difference in relation to the second embodiment is only that a divergent cylindrical lens 9 is not positioned in the immediate proximity of the film plane so that there is a free working spacing between the film and the objective, and also that the assembly has an additional positive cylindrical lens 10. That additional cylindrical lens 10 is positioned between the spherical objective part of the main objective 6 according to the invention and the negative cylindrical lens 9 and is oriented parallel thereto. The refractive power of the lens 10 is weaker by a factor of between 5 and 10 than that of the divergent cylindrical lens 9. The introduction of this slightly convergent cylindrical lens 10 produces vertically a slight positive additional astigmatism which in combination with the cylindrical attachment 7 and 8 provides for the complete disappearance of $M_V$. The other shell curvatures are equivalent to those of alternative configuration 2.

Table III sets out the design data of a third embodiment according to the invention.

TABLE III

| No | Radii | Spacings | Refractive indices $n_e$ | Abbe numbers $v_e$ |
|---|---|---|---|---|
| 1 | −151.9* | 4.8 | 1.623 | 60.1 |
| 2 | 40.0* | 13.0 | 1.624 | 36.1 |
| 3 | 137.5 | 86.2 | air | |
| 4 | ∞ | 4.5 | 1.624 | 36.1 |
| 5 | 101.3* | 11.2 | 1.623 | 60.1 |
| 6 | −137.5* | 2.0 | air | |

TABLE III-continued

| No | Radii | Spacings | Refractive indices $n_e$ | Abbe numbers $v_e$ |
|---|---|---|---|---|
| 7 | 68.5 | 9.0 | 1.643 | 59.9 |
| 8 | −690.3 | 0.1 | air | |
| 9 | 54.8 | 5.6 | 1.758 | 52.1 |
| 10 | 117.0 | 4.0 | air | |
| 11 | −1869.5 | 13.2 | 1.652 | 33.6 |
| 12 | 33.4 | 8.9 | air | |
| 13 | −36.2 | 1.9 | 1.652 | 33.6 |
| 14 | 198.4 | 5.2 | air | |
| 15 | 1488.1 | 6.4 | 1.758 | 52.1 |
| 16 | −49.7 | 0.4 | air | |
| 17 | 124.8 | 5.8 | 1.622 | 63.2 |
| 18 | −81.6 | 17.7 | air | |
| 19 | −151.9# | 4.0 | 1.652 | 33.6 |
| 20 | −122.0# | 23.8 | air | |
| 21 | −89.9# | 2.9 | 1.489 | 70.2 |
| 22 | 300.2# | | | |

*cylindrical surfaces
cylindrical surface in relation to * turned through 90° about the optical axis
aperture ratio 1:2
focal lengths: 99.1 and 48.3
anamorphic factor: 2.052
intercept length: 17.3

What is claimed is:

1. An anastigmatic anamorphic lens with a high aperture and an anamorphic factor of greater than 1.7, comprising a main objective and an afocal attachment which is formed from vertically oriented lenses,
   wherein a main objective is used, which horizontally with respect to the curved film surface has a flattened image field,
   horizontally with respect to the curved film surface has a flattened image field,
   vertically with respect to the curved film surface has a flattened or positively curved image field, and
   which has a positive astigmatism so that the meridional shell, viewed in the direction from the projection to the film surface, lies in front of the sagittal shell.

2. An anastigmatic anamorphic lens as set forth in claim 1 having the following design parameters:

| No | Radii | Spacings | Refractive indices $n_e$ | Abbe numbers $v_e$ |
|---|---|---|---|---|
| 1 | −101.3* | 4.0 | 1.591 | 61.0 |
| 2 | 50.0* | 7.7 | 1.762 | 27.2 |
| 3 | 87.3* | 71.3 | air | |
| 4 | ∞ | 4.4 | 1.711 | 30.3 |
| 5 | 122.4* | 9.5 | 1.716 | 53.8 |
| 6 | −122.4* | 2.0 | air | |
| 7 | 38.4 | 6.0 | 1.681 | 54.9 |
| 8 | −783.3 | 0.1 | air | |
| 9 | 35.9 | 3.8 | 1.758 | 52.3 |
| 10 | 55.5 | 2.2 | air | |
| 11 | −575.3 | 9.2 | 1.624 | 36.4 |
| 12 | 18.8 | 6.1 | air | |
| 13 | −18.5 | 1.5 | 1.704 | 30.1 |
| 14 | 70.7 | 1.7 | air | |
| 15 | 99.6 | 4.4 | 1.792 | 47.5 |
| 16 | −26.0 | 0.3 | air | |
| 17 | 115.2 | 3.9 | 1.732 | 54.7 |
| 18 | −53.2 | | | |

*cylindrical surfaces
aperture ratio 1:2
focal lengths: 60.6 and 31.5
anamorphic factor: 1.923
intercept length: 43.3.

3. An anastigmatic anamorphic lens as set forth in claim 1 having the following design parameters:

| No | Radii | Spacings | Refractive indices $n_e$ | Abbe numbers $v_e$ |
|---|---|---|---|---|
| 1 | −101.3* | 4.0 | 1.591 | 61.0 |
| 2 | 50.0* | 7.7 | 1.761 | 27.2 |
| 3 | 87.3* | 70.9 | air | |
| 4 | ∞ | 4.4 | 1.711 | 30.3 |
| 5 | 122.4* | 9.5 | 1.716 | 53.8 |
| 6 | −122.4* | 2.0 | air | |
| 7 | 35.8 | 7.6 | 1.681 | 54.9 |
| 8 | 299.6 | 0.1 | air | |
| 9 | 34.7 | 3.9 | 1.737 | 50.8 |
| 10 | 71.7 | 3.0 | air | |
| 11 | 236.9 | 2.2 | 1.617 | 36.7 |
| 12 | 18.7 | 20.5 | air | |
| 13 | −17.5 | 1.8 | 1.747 | 27.6 |
| 14 | 410.9 | 0.1 | air | |
| 15 | 420.0 | 7.9 | 1.808 | 46.3 |
| 16 | −23.8 | 0.1 | air | |
| 17 | 492.4 | 9.7 | 1.591 | 61.0 |
| 18 | −63.9 | 0.5 | air | |
| 19 | 73.0 | 3.5 | 1.748 | 44.4 |
| 20 | −854.9 | 31.5 | air | |
| 21 | ∞ | 2.5 | 1.519 | 64.0 |
| 22 | 104.0# | | | |

*cylindrical surfaces
cylindrical surface in relation to * turned through 90° about the optical axis
aperture ratio 1:2
focal lengths: 59.0 and 30.3
anamorphic factor: 1.947
intercept length: 2.8.

4. An anastigmatic anamorphic lens as set forth in claim 1 having the following design parameters:

| No | Radii | Spacings | Refractive indices $n_e$ | Abbe numbers $v_e$ |
|---|---|---|---|---|
| 1 | −101.3* | 4.0 | 1.591 | 61.0 |
| 2 | 50.0* | 7.7 | 1.762 | 27.2 |
| 3 | 87.3* | 71.3 | air | |
| 4 | ∞ | 4.4 | 1.711 | 30.3 |
| 5 | 122.4* | 9.5 | 1.716 | 53.8 |
| 6 | −122.4* | 2.0 | air | |
| 7 | 38.4 | 6.0 | 1.681 | 54.9 |
| 8 | −783.3 | 0.1 | air | |
| 9 | 35.9 | 3.8 | 1.758 | 52.3 |
| 10 | 55.5 | 2.2 | air | |
| 11 | −575.3 | 9.2 | 1.624 | 36.4 |
| 12 | 18.8 | 6.1 | air | |
| 13 | −18.5 | 1.5 | 1.704 | 30.1 |
| 14 | 70.7 | 1.7 | air | |
| 15 | 99.6 | 4.4 | 1.792 | 47.5 |
| 16 | −26.0 | 0.3 | air | |
| 17 | 115.2 | 3.9 | 1.732 | 54.7 |
| 18 | −53.2 | | | |

*cylindrical surfaces
cylindrical surface in relation to * turned through 90° about the optical axis
aperture ratio 1:2
focal lengths: 99.1 and 48.3
anamorphic factor: 2.052
intercept length: 17.3.

* * * * *